United States Patent
Karimi et al.

(10) Patent No.: US 11,708,424 B1
(45) Date of Patent: Jul. 25, 2023

(54) INCLUSION OF CHITOSAN AND HERBAL EXTRACTS AS AN ANTIMICROBIAL AGENT

(71) Applicants: Javad Karimi, Richmond Hill (CA); Mahdi Moradi Jalal, Richmond Hill (CA)

(72) Inventors: Javad Karimi, Richmond Hill (CA); Mahdi Moradi Jalal, Richmond Hill (CA)

( * ) Notice: Subject to any disclaimer, the term of this patent is extended or adjusted under 35 U.S.C. 154(b) by 0 days.

(21) Appl. No.: 17/742,500

(22) Filed: May 12, 2022

(51) Int. Cl.
*C08J 3/22* (2006.01)
*C08B 37/08* (2006.01)
*C08L 5/08* (2006.01)
*C08J 3/24* (2006.01)

(52) U.S. Cl.
CPC ............ *C08B 37/003* (2013.01); *C08J 3/22* (2013.01); *C08J 3/24* (2013.01); *C08L 5/08* (2013.01); *C08J 2305/08* (2013.01); *C08L 2203/02* (2013.01); *C08L 2310/00* (2013.01); *C08L 2312/00* (2013.01)

(58) Field of Classification Search
CPC ...... C08B 37/003; C08L 5/08; C08L 2203/02; C08L 2312/00; C08J 2305/08; C08J 3/22; C08J 3/24
USPC .......................................................... 527/300
See application file for complete search history.

(56) References Cited

U.S. PATENT DOCUMENTS 8,119,780 B2 * 2/2012 Baker .................. C08L 5/08
536/20
10,412,960 B2 * 9/2019 Bouchemal ........ A61K 47/6951

* cited by examiner

*Primary Examiner* — Hannah J Pak
(74) *Attorney, Agent, or Firm* — Nasser Ashgriz; UIPatent Inc

(57) ABSTRACT

The present invention is a product and process to produce a new inclusion of a Chitosan-based compound and herbal extract, to provide consistent and long-lasting antimicrobial, antiviral, antibacterial, antifungal, anti-spore, and anti-odor characteristics.

2 Claims, 5 Drawing Sheets

INCLUSION OF CHITOSAN AND HERBAL EXTRACTS AS AN ANTIMICROBIAL AGENT

FIELD OF THE INVENTION

The present invention relates in general to antimicrobial plastics, polymers, and fabrics and in particular, to the method of processing Chitosan-based microparticles with regular and petroleum-based polymers as well as other biopolymers to create antimicrobial (antiviral, antibacterial, antifungal, and anti-spore) characteristics consistently with long-term efficacy in different environmental conditions.

BACKGROUND OF THE INVENTION

Polymers are being used in a wide range of consumer products. People are regularly in direct contact with different polymer-based products, such as products for medical devices, drugs, cosmetics, packaging, education, sanitation, industrial, and many more. Microorganisms (e.g. bacteria, viruses, funguses, mycobacteria, bacterial spores, etc.) may form on the surfaces of such products and can lead to the creation of biofilms and other hard-to-disinfect microorganisms such as bacterial spores. Therefore, keeping such products in safe and hygienic conditions is important for public health.

Extensive measures have been taken to keep various polymer-based products safe. For instance, medical products used in health care centers are regularly sterilized and packaged to keep them away from pathogens. Therefore, if the products are fabricated using antimicrobial plastics, polymers, or fabrics, the product will be safer to use for consumers. Also, food and drugs are kept in plastic, and polymer packaging materials to keep them safe from various microorganisms and to prevent the intrusion of oxygen and air into packaging, which facilitates the spoiling process of food and drugs. Therefore, if plastic and polymer that have antimicrobial characteristics are used, it will increase the shelf life of the food and drugs from the production facility to consumers/patients.

Current plastics derivatives used in medical devices and PPE rarely have antimicrobial characteristics. The main reasons are that the current polymers with antimicrobial particles are costly and non-sustainable. The present invention is based on the incorporation of an organic active agent in the masterbatch of plastics, polymers, and fabrics in an affordable, sustainable method without long-term medical and health risks.

The current recycling process for contaminated plastics and polymers used in PPE and other consumer products in health and medical care applications (such as a catheter, etc.) may need a sterilization process with hospital-grade disinfectants before shipping the contaminated waste out of health care centers. Current disinfection procedures of PPE and other medical devices often need special treatment of chemicals and/or higher temperatures and pressure ranges. The present antimicrobial polymers have shown significant sporicidal characteristics in a longer contact time which can reduce the cost of recycling contaminated PPE and plastic products.

There are several different antimicrobial polymer-based materials. For example, U.S. Pat. No. 10,412,960 discloses the use of polysaccharides, a class of polymers, such as chitosan and chitin, to produce antimicrobial particles. Chitosan is a linear heteropolymer of N-acetyl-D-glucosamine and D-glucosamine joined together at 6 (1-4) according to the formula 1:

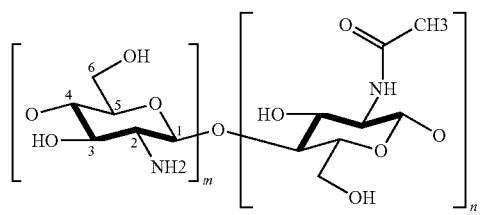

Formula 1

Here, m represents the number of D-glucosamine units, n represents the number of N-acetyl-D-glucosamine units, provided that the percentage of m relative to the total number of units is greater than 50%. Chitosan has the advantage of being biocompatible and mucoadhesive. In the currently available inclusions of Chitosan, the hydrophobic groups are often fixed covalently to the Chitosan by a nitrogen atom of the primary amino group (—NH2) or an oxygen atom of the primary and secondary hydroxyl groups (—OH) of said Chitosan. The same patent discloses several different inclusions of chitosan bearing hydrophobic groups grafted at the level of certain nitrogen atoms and has the formula 2:

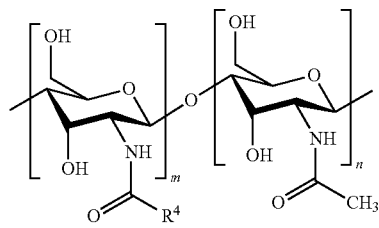

Formula 2

In all of the currently available Chitosan inclusions, the new compounds are grafted at the level of the oxygen atom of the primary and secondary hydroxyl groups (—OH) or on the nitrogen atom of the primary amino group (—NH2). Both hydroxyl groups and amino group are branches off from the internal 5C—O cycle formation of Chitosan (Formula 3). While both hydroxyl groups and amino group are easier options for functionalization with other compounds, they create relatively weak bonds and may lose their efficacy over a long period in applications such as drug delivery, wound healing, and cosmetics, with limited shelf-life. Functionalization of Chitosan through hydroxyl and amino groups is an easy process to break them and attach another molecule to them. For the same reason, they quickly lose their functionalized bonding which results in reducing their antimicrobial characteristics in changing environmental conditions.

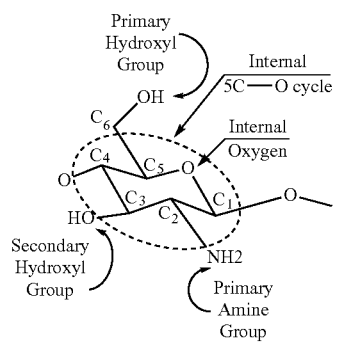

Formula 3

The present functionalization of Chitosan is a compound that sustains its antimicrobial characteristics for a long time (in the scale of years) in a wider range of environmental conditions (temperature, pressure, moisture, pH levels, etc.). Therefore, it can be used in the manufacturing of plastics, polymers, and fabrics to prevent the formation of microorganisms on the exterior surfaces of said products.

SUMMARY OF THE INVENTION

The present invention is a product and process to produce a new inclusion or formulation of a Chitosan-based compound, herein referred to as the Z-Chitosan. It is a compound with long-lasting antimicrobial, antiviral, antibacterial, antifungal, anti-spore, and anti-odor characteristics.

Z-Chitosan is formed from regular Chitosan which has the following form (Formula 1)

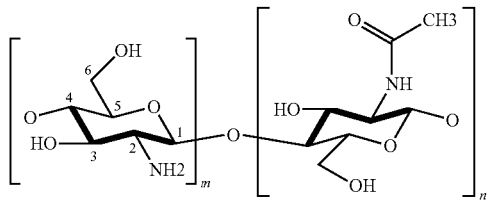

wherein m is the number of D-glucosamine units, and n is the number of number of N-acetyl-D-glucosamine units of Chitosan, in which a negatively charged oxygen atom is formed from breaking the —O— group in between C5 and C1 of an internal 5C—O cycle of Chitosan. Then herbal extracts are attached to the free oxygen atom to produce a stable antimicrobial inclusion.

A special process is developed to functionalize herbal extracts with the internal oxygen of Chitosan. The process comprises steps of preparing a liquid active agent comprising of 50 ppm to 5,000 ppm aqueous solution of each of a Chitosan group, a herbal extract group, and a catalyst group, using a multi-step emulsion crosslinking method for a total of 48 to 144 hours.

The final liquid active agent can then be dried to produce a powder of an active agent. The powder of active is then encapsulated within a polymer to make a masterbatch of the product. The 1-10 percent of produced masterbatch is then blended with a batch of plastic, polymer, or fabric to make a long-term and stable antimicrobial product.

Z-Chitosan can be blended with different petroleum-based and regular polymers, as well as biopolymers including but limited to Polyolefin, Polyamide (PA), Cellulose polymers, Polycarbonates, Thermosetting polymers, Elastomers, Polymethylpentene (PMP) and Acetal homopolymer (Polyoxymethylene POM), Epoxy resins, High-temperature thermoplastics, and Biopolymers.

A multi-step emulsion crosslinking method is used to manufacture Z-Chitosan as an active agent in the present invention. Herbal extracts such as Peppermint, *Origanum*, Thyme, Black cumin/seed, etc., are crosslinked precisely and efficiently to the Chitosan group using the presentation of a Catalyst group to increase the antimicrobial characteristics and stability of the final product.

While the Chitosan group and herbal extract group create antimicrobial efficacy, the catalyst group is used to facilitate crosslinking of the herbal extracts group to the Chitosan group and enhance the stability of the active agent incorporated into a final product.

The present invention is based on the incorporation of powder form of an organic active agent in the masterbatch of plastics, polymer, and fabric that is a sustainable method without long-term medical, and health risks.

"Chitosan+Herbal Extracts" active agent in powder form can also transform other plastic-based products used in health care centers with the risk of exposure to airborne pathogens into self-sanitizing products with a lower risk of Hospital-Associated Infections (HAIs) in the long-term operation of health care centers. For instance, using plastic-based consumer products in health care centers such as hospital furniture, garbage bags, wall panels, curtains, cleanroom curtains, covering, etc., can be transformed into self-sanitizing surfaces to minimize the risk of HAIs significantly.

"Chitosan+Herbal Extracts" active agent is stable against temperature, pH, humidity, and other environmental conditions to keep its antimicrobial efficacy. The experimental tests have shown that there was no release of antimicrobial particles, no-odor release, and no-physical degradation during service life which is significant in products with direct touch with the patient skin. Stability of final product in a wide range of temperatures (−100° C. to 300° C.). While the finished product is almost neutral (in pH level of 5.5-6), it keeps its antimicrobial efficacy in lower and higher pH ranges.

One object of the present invention is to provide an inclusion between Chitosan and herbal extracts that has a long-term antimicrobial effect.

Another object of the present invention is to provide microparticles of Chitosan and herbal extracts to be mixed with other polymers for antimicrobial effect.

Another object of the present invention is to provide microparticles of Chitosan and herbal extracts without the use of any harmful compounds.

Another object of the present invention is to provide a Chitosan inclusion with encapsulating characteristics.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
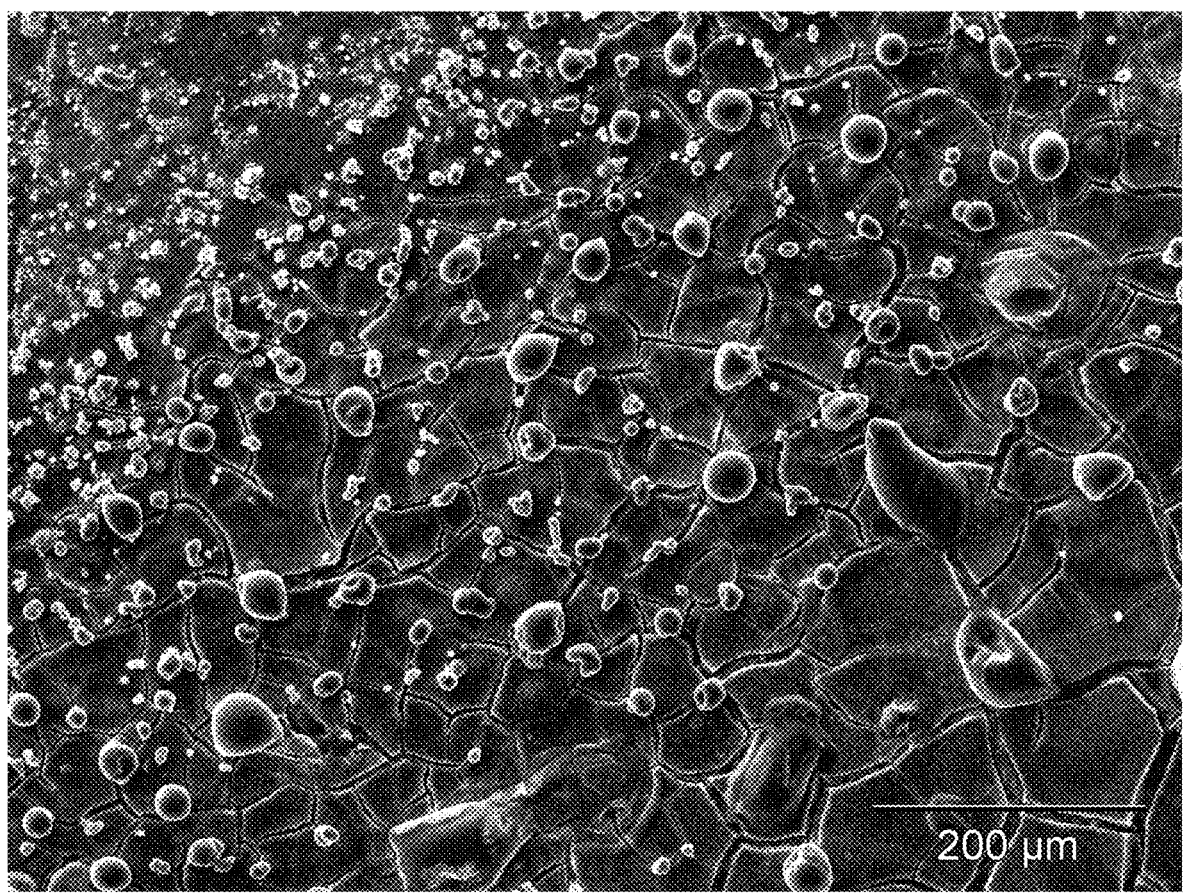
FIG. 1 shows an SEM image of functionalized Chitosan with different herbal extracts to create Z-Chitosan in liquid form.

Chitosan is a naturally occurring biomaterial made up of arbitrarily distributed β-(1→4) linked linear copolymer, employing monomeric units D-glucosamine (Left molecule) and N-acetyl-D-glucosamine (Right molecule) in Formula 1.

Generally, chitosan contains three functional groups at different sites: one primary amino group of C2—$NH_2$, one secondary hydroxyl group of C3—OH as well as one primary hydroxyl group of C6—OH. The modification at C2—$NH_2$ or C6—OH groups can be easily achieved because of their weak bonding strength and their positions in the molecular structure. But modifying chitosan at the site of C3—OH groups is harder because of the large steric hindrance.

There are two types of Oxygen atoms with bonding to Carbon atoms in Chitosan, extra-molecular Oxygen which bonds with D-glucosamine molecules, and N-acetyl-D-glucosamine Molecules together, and intra-molecular Oxygen with bonding to C1 and C6 in each D-glucosamine molecule and N-acetyl-D-glucosamine molecule.

The Z-Chitosan is cyclic oligomers of D-glucosamine and/or N-acetyl-D-glucosamine joined together in three forms of α, β, and γ cycles formed respectively from 6, 7, or 8 subunits, p=6 corresponds to α-cyclo Z-Chitosan; p=7 corresponds to β-cyclo Z-Chitosan and p=8 corresponds to γ-cyclo Z-Chitosan. They are shown in (Formula 5).

Their geometry is comparable to a truncated cone delimiting a cavity at its center (Formula 6).

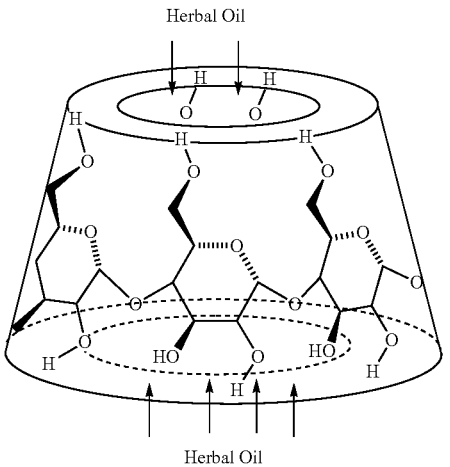

Formula 6

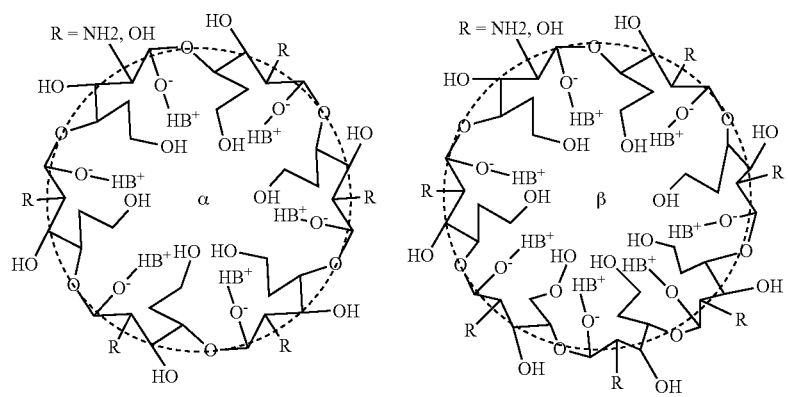

Formula 5

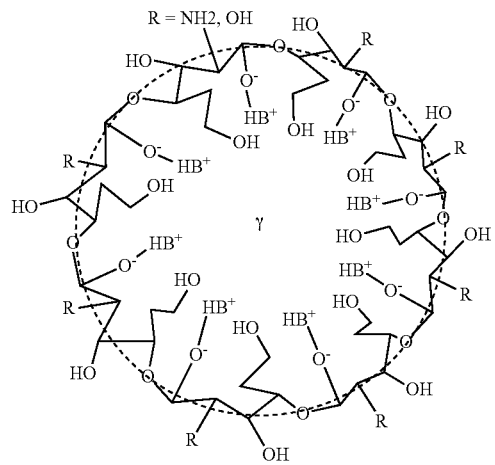

HB = Herbal Extract

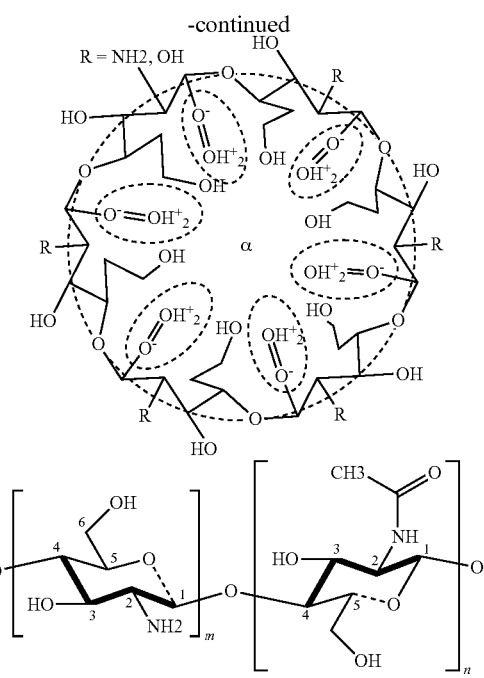

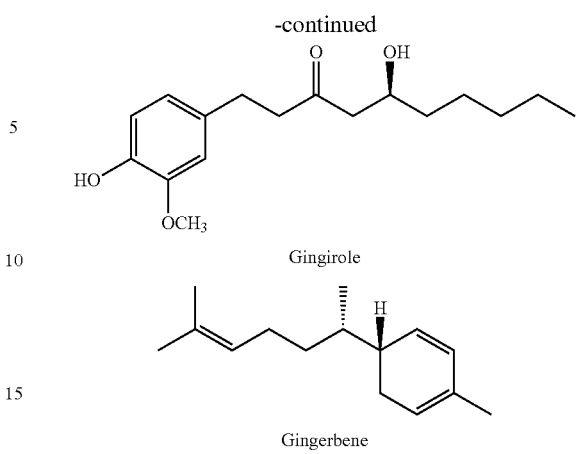

They are therefore cage molecules, capable of receiving molecules by inclusion, species in particular of a hydrophobic nature. The internal portion of the cavity is hydrophobic, and the external portion is hydrophilic.

The hydroxyl —OH groups may be substituted later, in particular with other groups, such as herbal extract. The substitutions may increase the solubility of the Z-Chitosan.

Existing antimicrobial active agents normally utilize single antimicrobial material or a combination of a maximum of two antimicrobial materials that often restrict the antimicrobial efficacy against different microorganisms. But, t h e "Chitosan+Herbal Extracts" active agent includes at least three different antimicrobial materials (Chitosan, and two herbal extracts such as Peppermint, *Origanum*, Thyme, Black cumin/seed) that are fully compatible with each other while superimposing each antimicrobial efficacy significantly and can inhibit a wide range of microorganisms (e.g. bacteria, viruses, funguses, mycobacteria, bacterial spores). Some of these compounds are (Formula 7 & 8 and 9). The chemical structures of ginger oil are (Formula 7).

Formula 7

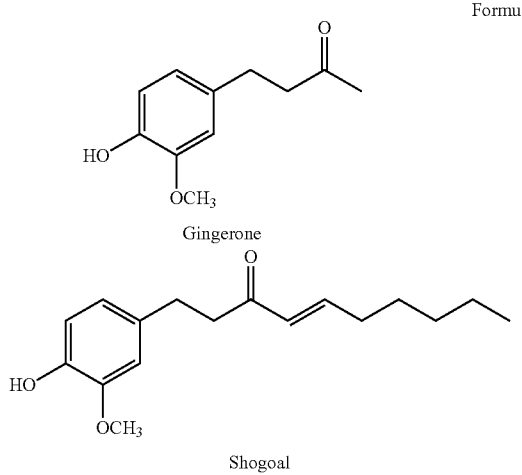

And the chemical structure of peppermint oil and thymol, from thyme oil, are (Formula 8)

Formula 8

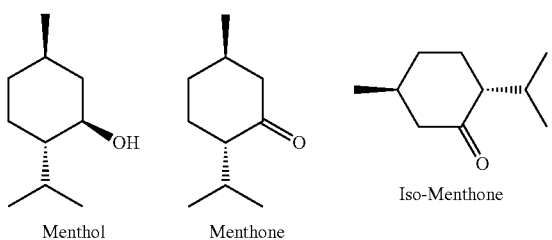

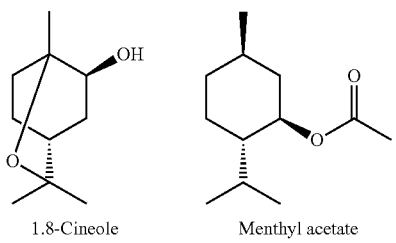

And the chemical structures of oregano oil including thymol are (Formula 9)

Formula 9

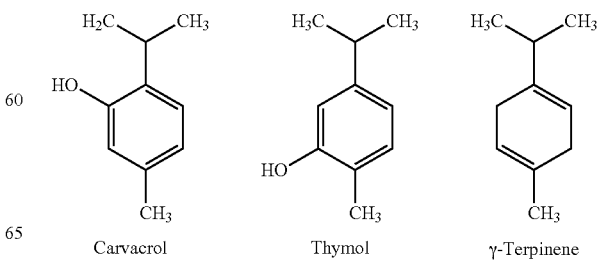

-continued

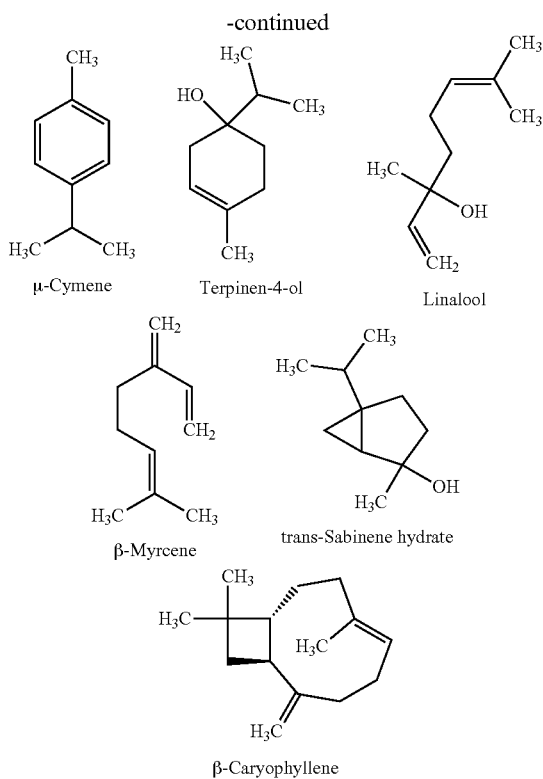

μ-Cymene
Terpinen-4-ol
Linalool
β-Myrcene
trans-Sabinene hydrate
β-Caryophyllene The method of making Z-Chitosan comprises the following steps:

Step #1: The first batch of a liquid active agent comprising 50 ppm to 5,000 ppm aqueous solution of each of a Chitosan group, and a catalyst group which are emulsified for 24 to 72 hours.

Step #2: At the same time, the second batch of a liquid active agent comprising 50 ppm to 5,000 ppm aqueous solution of each herbal extracts group and a catalyst group which are emulsified for 24 to 72 hours.

Step #3: The two batches of Step #1, and Step#2 are mixed with the addition of another batch of 50 ppm to 5,000 ppm aqueous solution of a catalyst group, and they are all mixed for 24 to 72 hours. This type of emulsification results in a final liquid active agent with covalent bonds (mainly triple bonds) and electrostatic bonds.

Step #4: Drying the liquid active agent by heat gradually to produce a powder form of the active agent.

During Step #1, a catalyst group added to a Chitosan group in emulsion format creates temporary and weak bonds with both primary and secondary hydroxyl groups as well as the primary amino group of the said Chitosan.

During Step #2, a catalyst group added to a herbal extracts group in emulsion format creates temporary and weak bonds with hydrogen bonds of the said herbal extracts molecules which are normally used for functionalization with Chitosan.

Figure 2:
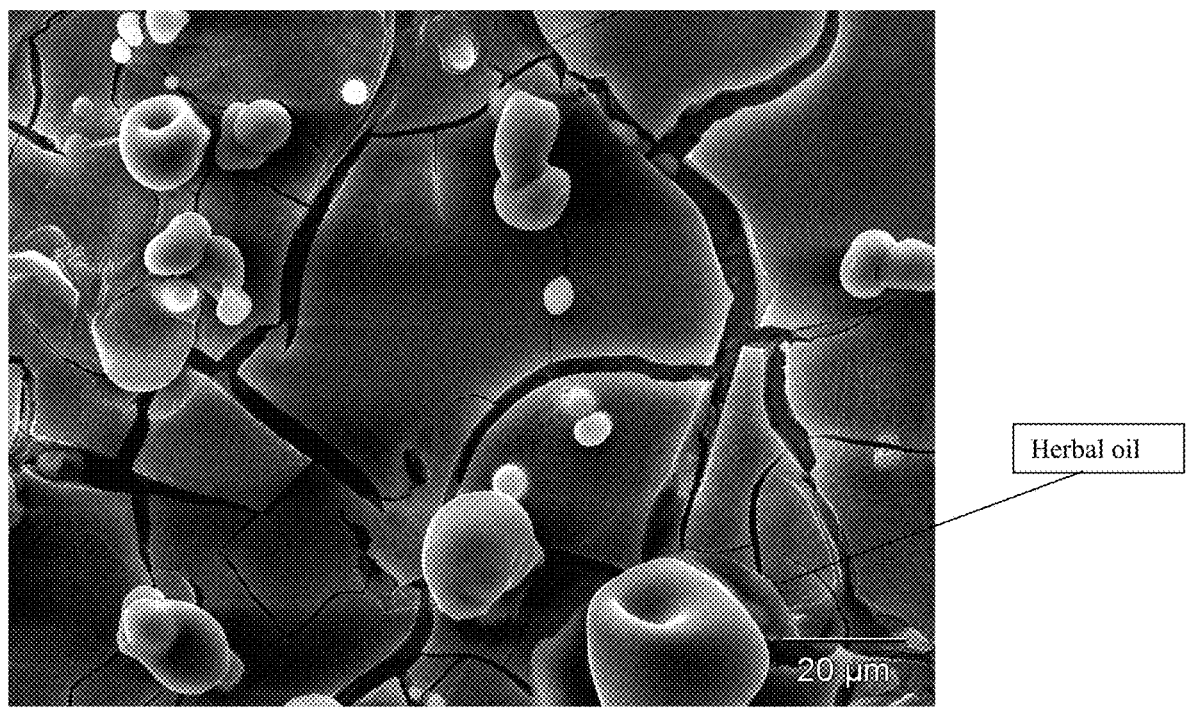
FIG. 2 shows an SEM image of functionalized Chitosan with different herbal extracts to create Z-Chitosan in liquid form.
Figure 3:
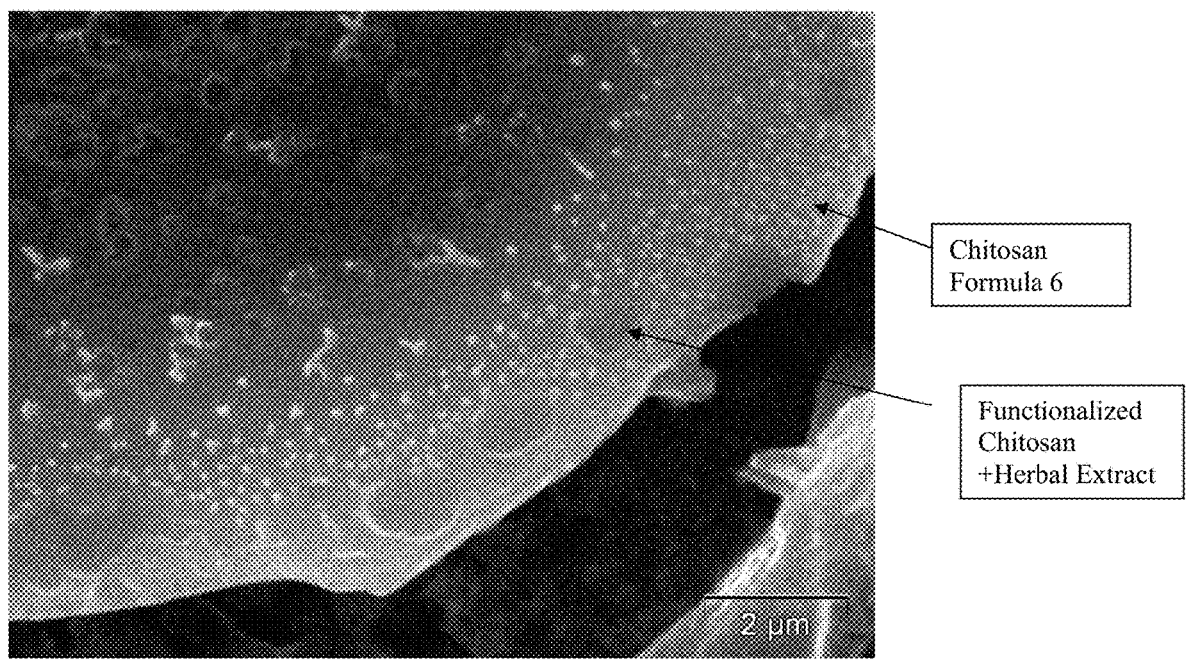
FIG. 3 shows an SEM image of functionalized Chitosan with different herbal extracts to create Z-Chitosan in liquid form, where the white spots are Chitosan molecules that have not been functionalized, and the larger and irregular-shaped footprints are functionalized Chitosan with herbal extracts.

Creation of temporary bonds in Step #1, and Step #2, will prevent typical functionalization of Chitosan group through both hydroxyl and amino group with added herbal extracts group in step #3 in presence of additional catalyst group, while Z-Chitosan is created as shown in FIGS. 1 to 3.

After the creation of Z-Chitosan, the temporary bonds created in Step#1, Step#2 between catalysts and Chitosan and herbal extracts are often gradually eliminated by heating step exposed during Step #4.

Figure 4:
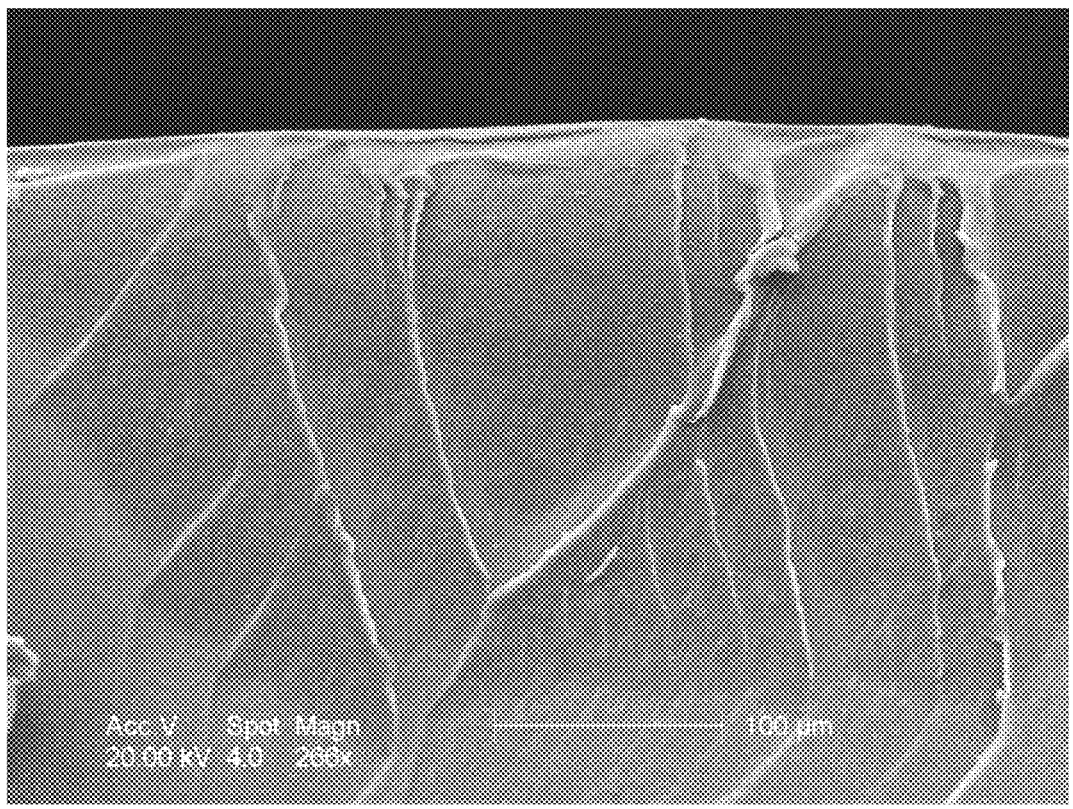
FIG. 4 shows the encapsulation of Z-chitosan into masterbatch of Polypropylene pellet.
Figure 5:
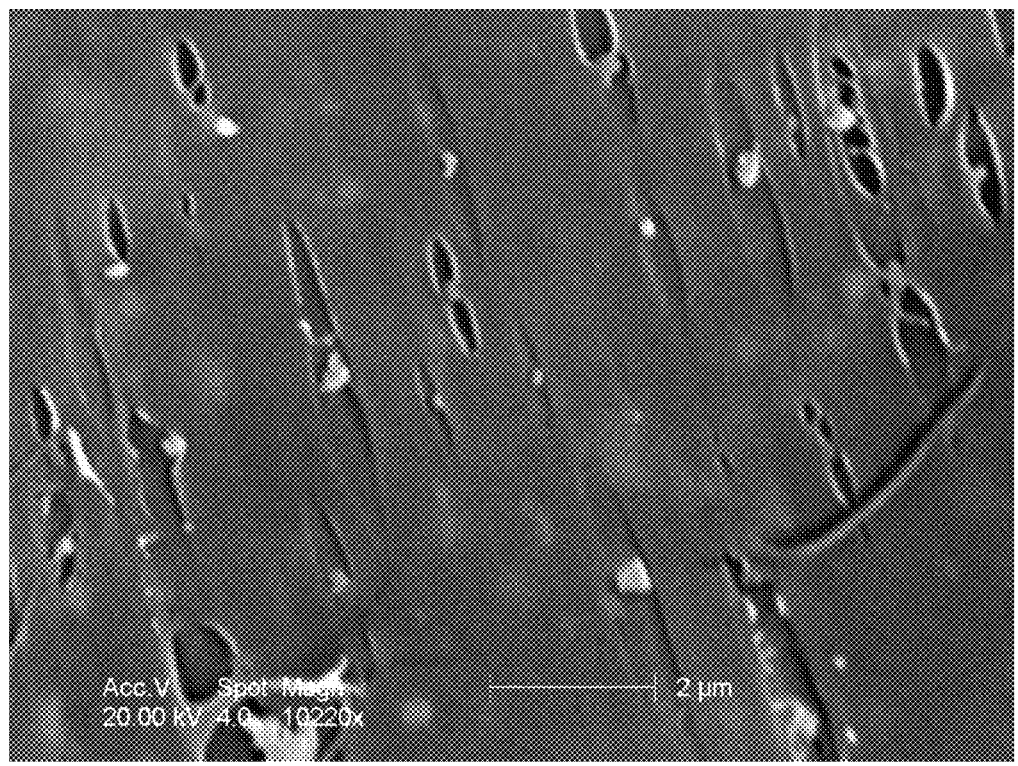
FIG. 5 shows the encapsulation of Z-chitosan into the masterbatch of Polypropylene pellet.

After drying in Step #4, the powder can then be encapsulated within a plastic, a polymer, to make a masterbatch of said product. Blending 1 to 10 percent of said masterbatch with a batch of plastic, polymer, or fabric can produce a long-term (in the scale of years) and consistent antimicrobial product as shown in FIGS. 4 and 5.

"Chitosan+Herbal Extracts" active agent has full stability against temperature, pH, humidity, and other environmental conditions to keep its antimicrobial efficacy. The experimental tests have shown that there was no release of antimicrobial particles, no-odor release, and no-physical degradation during service life, which is significant in products with direct touch with the patient skin. Stability of final product in a wide range of temperatures (−100° C. to 300° C.). While the finished product is almost neutral (in pH level of 5.5-6), it keeps its antimicrobial efficacy in lower and higher pH ranges.

The antimicrobial characteristics of individual materials listed in the present invention when integrated with the plastics, polymer, and fabrics are reported to be much lower than the 50% of inhibition rate of microorganisms in a very long contact time of 2 days. Such antimicrobial efficacy also diminishes when exposed to ambient conditions in a few months, which is not acceptable for long-lasting antimicrobial efficacy in antimicrobial plastic, polymer, and fabric products for consumers.

The present invention produces consistent, strong, and long-lasting antimicrobial a nd self-sanitizing (plastic, polymer, fabric) products with blending materials in different concentrations ranging from 50 ppm (part per million) to 5,000 ppm per group (Chitosan, Herbal Extracts, and Catalysts) which can be used separately, collectively and commonly with other organic materials for consistent and high antimicrobial efficacy rate of about 99% in a period of 2 hours to 24 hours based on the type of microorganisms.

In the present invention, a masterbatch of the product is used in the typical plastic molding and extrusion process of plastic, fabric, and polymeric products. The new newly manufactured products have shown very effective antimicrobial efficacy against a wide range of microorganisms of bacteria, viruses, funguses, mycobacteria, and bacterial spores in a contact time of 2 hours to 24 hours based on the type of microorganism.

The following herbal extracts have been shown to have high antimicrobial characteristics when combined with the present Z-Chitosan. These are Peppermint and its derivatives, Ginger and its derivatives, Oregano and its derivatives, Thymes and its derivatives, Black seed and cumin, and their derivatives, and the organic material of Tar and its derivatives, which are identified as an important catalyst for the consistent and long-lasting antimicrobial characteristics.

Numerous tests have been performed on the final products to validate the antimicrobial characteristics of the Chitosan+Herbal Extracts active agent. In other production batches, masterbatches of Chitosan+Herbal Extracts active agents were encapsulated in different types of polymers such as Nylon, PolyCarbonate, Poly Styrene, and Poly Ethylene. Then, the antimicrobial and self-sanitizing characteristics of said products against different types of microorganisms (spores, gram-positive and gram-negative bacteria, fungus) were tested based on two known industrial test methods (ASTM E2180-2018 and ISO 22196-2011) for 24 hours contact time. The growth inhibition in bacteria spore and killing ratio for funguses and bacteria were measured and listed in Table 1, which proves the long-term antimicrobial efficacy of the products on a scale of years.

TABLE 1

| Type of Microorganism | Name of Microorganism | Test Method | Growth Reduction or killing rate % after 24 hr | | | |
|---|---|---|---|---|---|---|
| | | | Nylon | Poly Carbonate | Poly Styrene | Poly Ethylene |
| Bacteria | Staphylococcus aureus (ATCC #6538) | ASTM E2180-18 | | | | 99.62% |
| Bacteria spore | Methicillin-Resistant Staphylococcus aureus (MRSA) (ATCC #33591) | ISO 22196-2011 | 66.30% | 66.70% | 86.10% | |
| Bacteria | Escherichia coli (ATCC #25922) | ISO 22196-2011 | 77.70% | 60.00% | 49.80% | |
| Bacteria | Staphylococcus aureus (ATCC #6538) | ISO 22196-2011 | 97.20% | 99.70% | 99.40% | |
| Fungus | Candida albicans (ATCC #10231) | ISO 22196-2011 | 77.60% | 71.10% | 68.40% | |
| Longevity of Antimicrobial Efficacy | | Age at Time of Test | 9 months | 17 months | 13 months | 7 months |

Other tests have been performed on the epoxy coating to validate the antimicrobial characteristics of the Chitosan+ Herbal Extracts active agent. In other production batches, masterbatches of Chitosan+Herbal Extracts active agents were encapsulated in Polyamide resin. Then, antimicrobial polyamide resin was mixed with its hardener and applied over different hard surface samples such as wood panels, metal sheets, and stones. Then, after 10 months of fabrication of the samples with epoxy coat, the antimicrobial and self-sanitizing characteristics of said products against different Hospital Associated Infections (HAI) pathogens were tested based on ISO 22196-2011 as a known industrial test method for 2 hours of contact time (shorter than Table 1). The inhibition rates for bacteria and funguses were measured and listed in Table 2, which proves the long-term antimicrobial efficacy of the products on a scale of years.

TABLE 2

| Type | Name of Microorganism | ATCC # | Growth Reduction or killing rate % after 2 hr |
|---|---|---|---|
| Bacteria | Staphylococcus aureus | ATCC #6538 | 99.8% |
| Fungus | Candida albicans | ATCC #10231 | 99.2% |
| Bacteria | Escherichia coli | ATCC #25922 | >99.9% |

Other tests have been performed on the different fabrics to validate the antimicrobial characteristics of the Chitosan+ Herbal Extracts active agent. Masterbatches of Chitosan+ Herbal Extracts active agents were encapsulated in Polypropylene and Polyester. Then, after 9 and 3 months of post-production of fabric samples, the antimicrobial and self-sanitizing characteristics of said products against different microorganisms were tested based on ISO 20743-2013, AATCC 100-2019, and ASTM E 2149-2020, as known industrial tests method for 24 hours contact time. The growth inhibition in bacteria spore and killing ratio for funguses and bacteria were measured and listed in Table 3, which proves the long-term antimicrobial efficacy of the fabric products.

TABLE 3

| Type of organism Micro | Name of Microorganism | Test Method | Growth Reduction or killing rate % after 24 hr | | | |
|---|---|---|---|---|---|---|
| | | | Polypropylene (spun bound) | Polyester (carpet) | Polyester (knitted fabric) | Polyester (carpet) |
| Bacteria spore | Methicillin-Resistant Staphylococcus aureus (MRSA) (ATCC #33591) | ISO 20743:2013 | 97.90% | | | |
| Fungus | Candida albicans (ATCC #10231) | ISO 20743:2013 | 94.20% | | | |
| Bacteria | Escherichia coli (ATCC #25922) | ISO 20743:2013 | 61.10% | | | |
| Bacteria | Staphylococcus aureus (ATCC #6538) | AATCC 100-2019 | | 94.88% | 89.31% | 99.25% |
| Bacteria | Staphylococcus aureus (ATCC #6538) | ASTM E 2149-2020 | | 95.57% | 87.83% | 91.60% |
| Longevity of Antimicrobial Efficacy | | Age at Time of Test | 9 months | 3 months | 3 months | 3 months |

The following materials are used as Chitosan group for manufacturing of Z-Chitosan in the present invention. (A) Chitin, Chitosan, and Chitosan derivatives are nontoxic, and biocompatible, antimicrobial (antiviral, antibacterial, and antifungal). To increase antimicrobial characteristics, Chitin and Chitosan and their derivatives have been used in different forms of suspension, liquid, powder, granule, sponge, encapsulated in regular polymers and biopolymers. (B) Quaternary Ammonium and its derivatives (QAC) were used to enhance antimicrobial (antiviral, antibacterial, antifungal) characteristics along with Chitin, Chitosan derivatives in polymers. QAC derivatives such as N-alkylated poly(4-vinyl pyridine), Methyltrialkylammonium chloride, Methyltrialkylammonium chloride, (Vinylbenzyl)trimethylammonium. Polyacrylonitrile-block-poly (n-butyl acrylate), can be added to the Chitosan group individually and collectively in different mixing amounts to enhance antimicrobial characteristics of the polymer, plastic, and fabric. Polyhexamethylene Biguanide (PHMB), Polyhexanide in two forms of a biguanide and have shown antimicrobial characteristics in polymers and were used in this invention.

Antimicrobial Peptides (AMPs) with synthetic amino acids have shown antimicrobial characteristics in polymers. Cationic AMPs as biocompatible compounds have shown higher antimicrobial characteristics, especially on gram-positive and gram-negative bacteria. Antimicrobial enzymes have shown antimicrobial characteristics in polymers. Proteolytic enzymes such as Subtilisin, Lysostaphin, Lysine, Amylase, Alginate Lyase, Oxidative enzymes, Lipase, Peptidase, and Esterase enzymes, have shown antimicrobial characteristics in polymers.

Any of the following can be used as herbal extracts group to enhance the antimicrobial effect of Z-Chitosan: Sericin, Neem, Tulsi Leave, Honey (methyl hydroxy furfural), Olive oil, Onion peels, Henna, Pepper, Saffron, Turmeric, Black cumin/seed, Dill extract, Mint, Cutchin tea, Apple cider vinegar, Garlic, and its extract, Cranberry, Cinnamon peels, Cloves, Guava, Indian lavender, Thyme, *Eucalyptus* Oil, Lemongrass essential oil, Thymol, Oregano Oil, Rosemary, Garlic essential oils, Garlic oil, Grapefruit seed extract, Clove Oil (eugenol), Tea extract, Cypress, Karanga, Cashew Shell & oil, Bamboo charcoal, Bay laurel, Grape seed extract, Mango seed extract, Tarragon, Lavender oil, Lemon, Chamomile, Fennel flower, Nutmeg, Anise extract, Prickly Chaff Flowers, Aloe Vera, Adzuki Beans (*Vigna angularis*) extracts, Andrographis plant, Leaves, and roots of Catharanthus *roseus* Linn, Roots of *Coleus forskohlii*, the stem of Derris *scandens* (Roxb.) Benth, leaves of Gynandropsis gynandra, the stem of Hyptis *suaveolens*, Extract and texture of *Melia azedarach* L., seeds, and roots of Moringa *heterophylla* L, roots and stems of Salvadora persic, Linn, fruit, and plant of Terminalia chebula Retz, Asteraceae, Lamiaceae, Melissa, Clinopodium, Apiaceae, Torilis, Fabaceae, Dorycniu, *Cytisus*, and Seaweed have shown antimicrobial characteristics and have been used in this invention.

Any of the following can be used to enhance the antimicrobial efficacy of Z-Chitosan.

I. Tar is a viscous liquid of hydrocarbons and free carbon, obtained from different organic materials such as coal, wood, petroleum, or peat through destructive distillation. Tar Aromatic derivatives have shown antimicrobial characteristics and have been used in this invention.

II. Alum is a compound in the formulation of AB (SO4) 2.12H2O whereas White alum has medical and industrial applications. Potassium alum (KAL (SO4) 2.12H2O) is an efficient, safe, and eco-friendly acid catalyst in implementing a large number of organic transformations with antimicrobial characteristics and was used in this invention.

III. N-halamine and its derivatives have shown antimicrobial characteristics on the surface of cellulosic, polyamide, and polyester fibers and have been used in this invention.

IV. Aromatic compounds such as Zeolite and some natural aromatic compounds (such as the scent of flowers) have been used in antimicrobial polymers.

V Cellulose, Bentonite, Terpenes, Anioinc Anionic compounds, and some fungi with antimicrobial efficacy have shown high antimicrobial characteristics and have been used in this invention.

VI. Antibiotics such as Terbinafine, Clotrimazole, Ketoconazole, Penicillin, Amoxicillin, Cephalosporin, Macrolide (Erythromycin, E-Mycin, Clarithromycin, Biaxin, Azithromycin, Zithromax), Fluoroquinolone (Cipro, Levaquin, Floxin), Sulfonamides (Trimethoprim/Sulfamethoxazole, Proloprim), Tetracycline (Sumycin, Panmycin, Vibramycin), Aminoglycoside (Garamycin, Tobrex) have shown high antimicrobial characteristics and have been used in this invention.

VII. Funguses such as *Colletotrichum, Phomopsis, Periconia, Guignardia, Rhizoctonia, Aspergillus, Pichia, Xylaria, Thielavia, Ampelomyces, Fusarium, Trichoderma*, Microsphaeropsis, Microdiplodia, *Alternaria*, Chloridium have shown antimicrobial characteristics in polymers and have been used in this invention.

VIII. Organic acids herbs, spices, and other plants, Phenolic derivatives including but not limited to Resorcinol, Organic Chlorine, Methylated, Flavones, Flavonols, Alkaloids (e.g., α-tomatine), Hydroxyphenyl—threne derivatives (Lactones).

IX. Protein-like compounds, Glucosides, Glycosides, dienes, Sulfoxides, Isothiocyanates, Phytoalexins, Chavicol, Carvacrol, Thymol, Eugenol, Caffeic acid, Cathecol, Vanillin, Gallic acid, 6-Gingerol, Zingerone, Coumarin, Cinnamic acid, Citral B (Neral), Limonene, Menthol, Cymene, Anethole, Cuminal, α-Terpinene, Oleuropein, Allicin, Allyl isothyocyanate, Geraniol have antibacterial characteristics and have been used in this invention.

Different manufacturing methods, such as Tensile, Extrusion (melt) spinning, Phase separation spinning, Edge-crimping, Electrospinning, Solution (dry and wet) spinning, Dry-jet wet spinning, and Gel (semi-melt) spinning, can be used for manufacturing the present antimicrobial plastics, polymers, and fabrics.

This invention can be used to introduce antimicrobial characteristics into the following plastics, polymers, fabrics: Polyolefin, Polyamide (PA), Cellulose polymers, Polycarbonates, Thermosetting polymers, Elastomers,—Polymethylpentene (PMP), and Acetal homopolymer (Polyoxymethylene POM) Epoxy resins, High-temperature thermoplastics, and Biopolymers.

Polyolefin is selected from the groups consisting of: (i) Polyethylene, High Density Polyethylene (HDPE), Low Density Polyethylene (LDPE), Ultra-high-molecular-weight polyethylene (UMHPE), Polypropylene (PP), PP copolymers, COC, Polybutylene; (ii) Polyvinyl chloride (PVC), Chlorinated polyvinyl chloride (CPVC); (iii) Polyvinyl acetate (PVA), PVAc, Poly (ethenyl ethanoate); (iv) Polystyrene/Styrenics, Acrylonitrile butadiene styrene (ABS), SAN; (v) Polymethylpentene (PMP), and (vi) Fluoropolymers, Polychlorotrifluoroethylene (PCTFE or PTFCE), Polyvinylidene fluoride (PVDF), FEP, ECTFE/ETFE, PVF/PVF2.

Thermosetting polymers are selected from the groups consisting of (i) Polyurethanes; (ii) Polyester resin, Copolyesters, and (iii) Vulcanized rubber.

Elastomer polymers are selected from the groups consisting of (i) Trans-1,4-polyisoprene (PIR); (ii) Styrene-butadiene rubber (SBR); (iii) Nitrile rubber (NR) and (iv) Butyl rubber.

High-temperature thermoplastics are selected from the groups consisting of Polysulfones, PPS, LCP, PEI, and PEEK.

Biopolymers are selected from the groups consisting of Natural Rubber (NR), Collagen, Silk fibroin, Gelatin, Starch, Polysaccharides, Alginate, and their derivatives.

The present product has a consistent and long-lasting antimicrobial characteristic that can be incorporated into a wide range of plastics, polymers, and fabrics to disinfect over 650 microorganisms of bacteria, viruses, funguses, mycobacteria, and bacterial spores. They include but are not limited to *Escherichia coli, Pseudomonas aeruginosa, Salmonella enterica, Bacillus atrophaeus, Bacillus cereus, Bacillus stearothermophilus, Clostridium perfringens, Enterobacter aerogenes, Staphylococcus Aureus* Subsp. *Aureus, Streptococcus Pneumoniae*, Bovine Corona Virus, Human immunodeficiency syndrome (HIV), SARS-COV-2.

The present product is nontoxic for personal and medical applications of the invention including but not limited to the MTT array test for assessing cell metabolic activity based on the ISO10993 method.

The present product has high resiliency and resistivity in the pathogenic environment which shall kill more microorganisms when in touch with the person. It prevents biofilm colonization in the environment. Some microorganisms become resistant to various types of antibiotics after multiple destructions, in other words, they change their structure to survive. However, this invention provides effective tools by utilizing some mechanisms for the prevention of such microorganisms being resistant to the environment. Due to the low ratio of antimicrobial agent blended in the base plastic, polymer, and fabric, the finished product is not much expensive as regular plastic, polymer, and fabric product. The process of manufacturing antimicrobial plastic, polymer, and fabrics is very identical to the manufacturing of regular plastic, polymer, fabrics with the minimum enhancement of mixing the antimicrobial agent in a pre-defined ratio into raw materials.

The present material can be used for consistent and long-lasting sanitization of a wide range of microorganisms on the hard surfaces of products made with plastic, polymer, and fabrics. It can be used for self-sanitizing of polymeric products through antimicrobial polymeric products and other products with direct touching points, including but not limited to ID Cards, Bank Cards, Credit Cards, Gas Station Nozzles, Knobs, Doors, Furniture, Toys, Stationery, Seats, Flooring, Ceiling, Wall Panels, in private and public places and tools such as Subways, Airports, Public Transit Terminals and any other consumer products that can be touched by humans. It can also be used on all forms of finished products to inhibit microorganisms in foods in food-grade plastics for packaging and appliances with direct contact with foods such as refrigerators, freezers, and similar food-containing products. All forms of Personal Health Products can be used in Sanitary Pads, Tampons, and different types of Diapers, Tissues, wound dressing, gaseous bandages, a n d drug packaging plastics. All forms of finished products can be used in consumer products with t h e risk of transmission of microorganisms to people such as garbage bags, enclosure and bottling of consumer goods, medical tools, and similar products. All forms of antimicrobial plastics can be used to effectively recycle regular plastics, polymers, and fabrics into new consumer products with antimicrobial characteristics. All forms of antimicrobial plastics can be used in filaments of additive manufacturing (3D printing).

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Concerning the above description, it is to be realized that the optimum relationships for the parts of the invention regarding size, shape, form, materials, function, and manner of operation, assembly, and use are deemed readily apparent and obvious to those skilled in the art, and all equivalent relationships to those illustrated in the drawings and described in the specification are intended to be encompassed by the present invention.

What is claimed is:

1. An inclusion complex, referred to as Z-Chitosan, formed by interaction in solvent between: Chitosan bearing hydrophobic groups of the formula

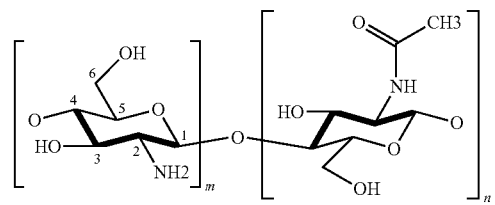

wherein m is the number of D-glucosamine units, and n is the number of N-acetyl-D-glucosamine units of Chitosan, in which a negatively charged oxygen atom is formed from breaking the —O— group in between C5 and C1 of an internal 5C—O cycle of Chitosan, and at least one herbal extract, in the presence of a catalyst, is attached to the negatively charged atom in cyclic oligomers of D-glucosamine and/or N-acetyl-D-glucosamine joined together in three forms of α, β, and γ cycles formed respectively from 6, 7, or 8 subunits in a truncated cone delimiting a cavity at its center, and in which the at least one herbal extract is attached to the negatively charged oxygen atom to form:

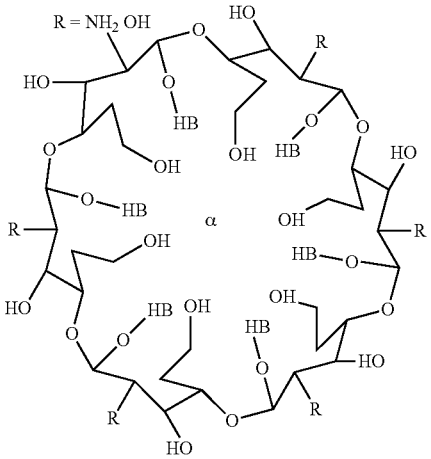

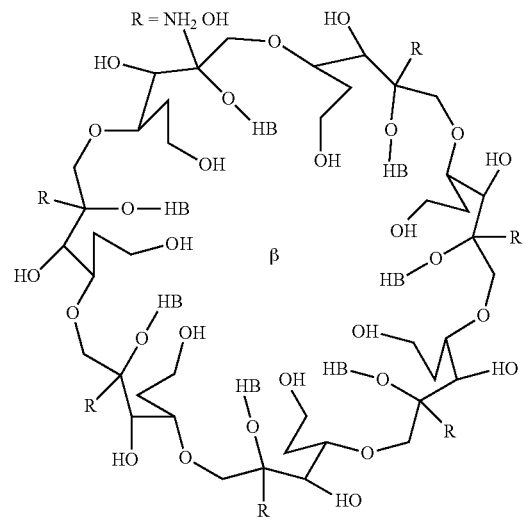

-continued

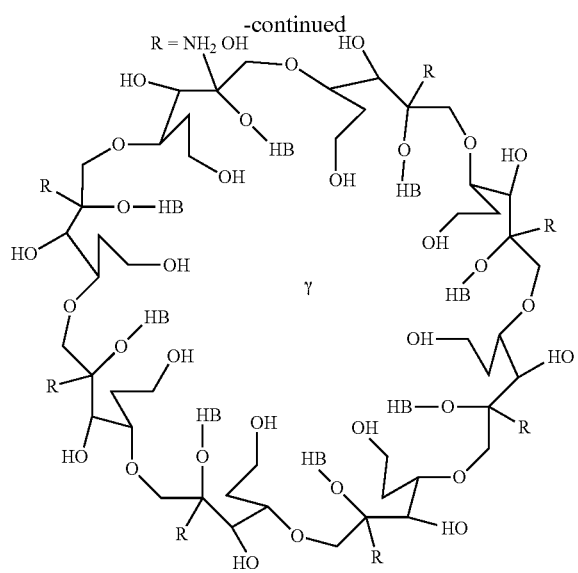

HB = Herbal Extract

2. The inclusion of claim 1, wherein said herbal extract is selected from the group consisting of a Sericin, a Neem, Tulsi Leave, Olive, Onion peels, Henna, Pepper, Saffron, Turmeric, Black cumin, black seed, Dill, Mint, Cutchin tea, Apple cider, Garlic, Cranberry, Cinnamon peels, Cloves, Guava, Indian lavender, Thyme, *Eucalyptus*, Bamboo charcoal, Bay laurel, Grape seed, Mango seed, Tarragon, Lavender, Lemon, Chamomile, Fennel flower, Nutmeg, Oregano, Cashew, Anise, Prickly Chaff Flowers, Aloe Vera, Adzuki Beans, Lemongrass, Thymol, Rosemary, Grapefruit, Clove, Cypress, Karanga, Resorcinol, Cellulose, Bentonite, Terpenes, Bogus, Rapeseed, Sugar Cane, Andrographis plant, Catharanthus *roseus* Linn, *Coleus forskohlii, Derris scandens*, Benth, Gynandropsis gynandra, Hyptis *suaveolens, Melia azedarach, Moringa heterophylla*, Salvadora persic, Linn, Terminalia chebula Retz, Asteraceae, Lamiaceae, Melissa, Clinopodium, Apiaceae, Torilis, Fabaceae, Dorycniu, *Cytisus*, and Seaweed.

\* \* \* \* \*